May 16, 1944.   J. L. DOUGLASS   2,349,081
TUBE COUPLING
Filed Jan. 25, 1943

INVENTOR
James L. Douglass
BY
Evans & McCoy
ATTORNEYS

Patented May 16, 1944

2,349,081

UNITED STATES PATENT OFFICE 2,349,081

TUBE COUPLING

James L. Douglass, Cleveland Heights, Ohio

Application January 25, 1943, Serial No. 473,445

1 Claim. (Cl. 285—86)

This invention relates to couplings for thin-walled pipes or tubes of the type in which the pipes have flared ends which are clamped between tapering seats formed on the coupling members.

This invention has for its object to provide a coupling of the character referred to, which is of very simple construction, which can be manufactured at small cost, which may be quickly and easily assembled, and which facilitates the assembly of couplings close to a header or upon very short tubes and in places where it is difficult to apply a wrench to the thimble at one end of the coupling.

More specifically, it is the object of the invention to provide a coupling in which the pipe-clamping seats float concentrically within an external coupling sleeve that is adapted to occupy various positions of axial adjustment with respect to the other coupling elements, and in which the clamping connections for both pipe ends may be simultaneously tightened by turning either one of the two thimbles in the ends of the coupling sleeve.

With the above and other objects in view, the invention may be said to comprise the coupling as illustrated in the accompanying drawing, hereinafter described, and particularly set forth in the appended claim, together with such variations and modifications thereof as will be apparent to one skilled in the art to which the invention pertains.

Reference should be had to the accompanying drawing forming a part of this specification, in which.

Figure 1:
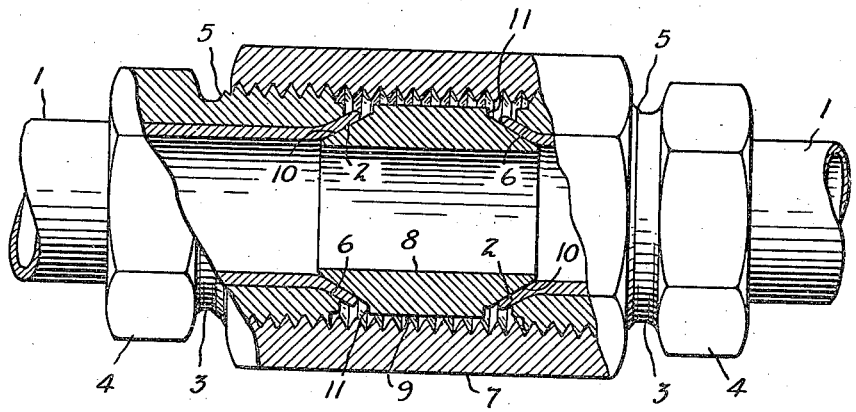
Figure 1 shows the pipe coupling partly in side elevation and partly in axial section.
Figure 2:
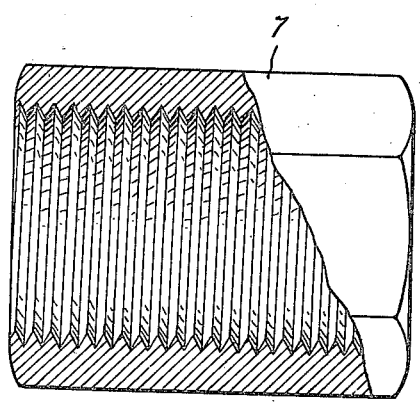
Fig. 2 is a view showing the coupling sleeve partly in axial section and partly in side elevation.
Figure 3:
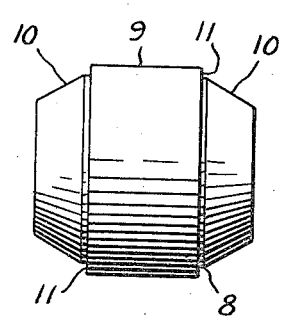
Fig. 3 is a side elevation of the tubular spacer to which the flared ends of the pipes are clamped.

Referring to the accompanying drawing, the coupling of the present invention is shown applied to pipes 1 which have flared ends 2, which are clamped by the coupling members. A clamping thimble 3 has a sliding fit upon each of the pipes 1 and each clamping thimble has an enlarged wrench-receiving outer end portion 4 and an external thread 5 on its inner end portion. Each of the thimbles 3 has a flaring conical internal seat 6 at its inner end which is adapted to bear against the flared end 2 of the pipe upon which it is mounted. The thimbles 3 may be placed upon the pipes before the ends of the pipes are flared, and the ends of the pipes may be expanded against the seats 6 of the thimbles by means of a suitable tool. The clamping thimbles 3 are adapted to screw into the opposite ends of an internally threaded coupling sleeve 7, which is of substantially uniform internal diameter from end to end and which may have a polygonal, external shape suitable for receiving a wrench.

A tubular spacer 8 is interposed between the flared ends 2 of the pipes within the coupling sleeve 7. The spacer 8 has an externally cylindrical body portion 9 which is of a diameter only slightly less than the internal diameter of the sleeve 7 and of a length such that the spacer can have only a slight angular tilting movement when positioned within the sleeve 7. The tubular spacer 8 has conical seats 10 at the end thereof which are formed to substantially the same taper as the seats 6 of the clamping thimbles and which are adapted to interiorly engage the flared ends 2 of the pipes. The external diameter of the spacer 8 is greater than the diameter of the flared ends of the pipes 1 and shoulders 11 are provided at the inner ends of the tapered seats 10, the inner ends of the seats 10 being of a diameter greater than the internal diameter at the outer of the pipes so that the pipe ends are spaced somewhat from the shoulders 11 when the coupling is tightened.

Since the tubular spacer 8 is positioned by the pipes and has no abutment against the clamping sleeve 7, the clamping sleeve 7 may occupy various positions of axial adjustment with respect to the clamping thimbles 3 and spacer 8. Also, the sleeve 7 may be joined to the thimble 3 on either one of the pipes before the spacer and the opposite clamping sleeve and pipe are assembled therewith. By reason of the fact that the clamping sleeve 7 floats freely with respect to the other coupling elements, the joints between both pipes and the central spacer may be tightened by tightening either one of the clamping thimbles 3 so that only one of the clamping thimbles need be accessible for engagement with the wrench.

Although one embodiment of the invention has been herein shown and described, it will be understood that numerous modifications of the construction shown may be resorted to without departing from the spirit of this invention as defined in the appended claim.

What I claim is:

A pipe coupling comprising a coupling sleeve having a bore of uniform diameter, and threaded from end to end, a pair of externally threaded clamping thimbles adapted to be screwed into opposite ends of the sleeve, each thimble being adapted to slidably fit upon a pipe and having a flaring seat adapted to exteriorly engage a flared end of said pipe, and a tubular spacer adapted to be interposed between the ends of the pipes, said spacer having tapered seats at its ends adapted to interiorly engage the flared ends of the pipes and a body portion of an external diameter greater than that of the flared ends of the pipes but less than the internal diameter of the sleeve, whereby the coupling sleeve is free to move axially in either direction with respect to the spacer.

JAMES L. DOUGLASS.